July 7, 1964    T. G. GRANRYD    3,139,766
TRANSMISSION CONTROLS
Filed Dec. 5, 1961
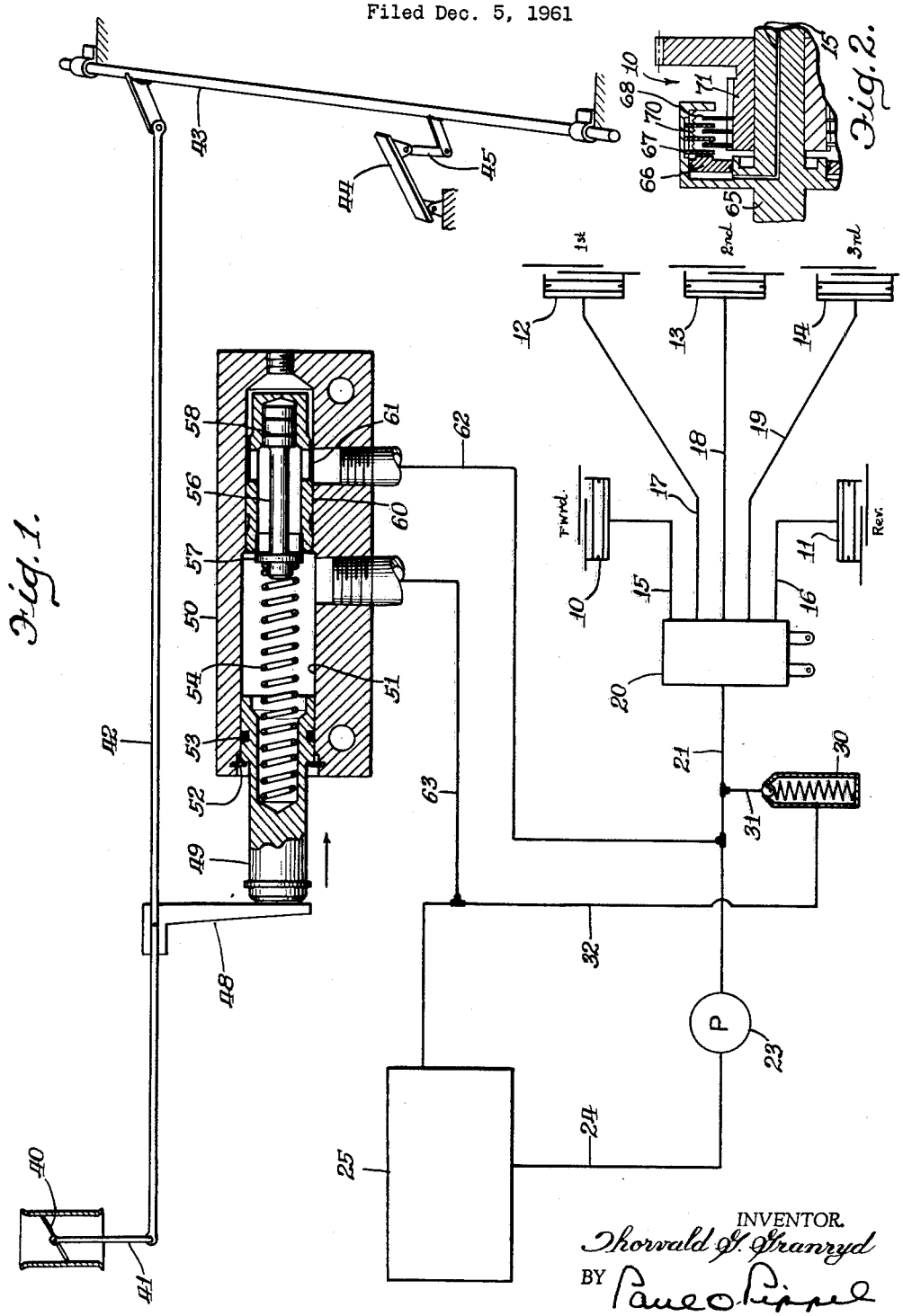
INVENTOR.
Thorvald G. Granryd
BY Paul O. Pippel
Atty.

United States Patent Office 3,139,766
Patented July 7, 1964

3,139,766
TRANSMISSION CONTROLS
Thorvald G. Granryd, Libertyville, Ill., assignor to The Frank G. Hough Co., a corporation of Illinois
Filed Dec. 5, 1961, Ser. No. 157,227
8 Claims. (Cl. 74—472)

This invention relates generally to transmission controls, and more specifically to a novel arrangement for reducing shifting shock in a hydraulically controlled transmission.

The primary object of the present invention is to provide a novel arrangement which will substantially reduce or eliminate the shifting shocks which commonly occur in hydraulically controlled transmissions when the transmission is shifted from one speed ratio to another.

It is another object of the present invention to provide a novel throttle-controlled hydraulic pressure-reducing arrangement cooperating with a hydraulically controlled transmission to substantially reduce or eliminate shifting shocks experienced in the shifting of a hydraulically controlled transmission from one speed ratio to another.

A further object of the present invention is to provide in a motor vehicle an arrangement of a differential type pressure-regulating valve cooperating with the vehicle engine throttle to substantially reduce or eliminate shifting shocks in the shifting of the hydraulically controlled transmission from one speed ratio to another.

Other objects and features of the present invention will be apparent upon a perusal of the following specification and drawing in which:

FIGURE 1 shows the invention in substantially diagrammatic form; and

FIGURE 2 shows on an enlarged scale details of a fragmentary cross sectional view of one of the clutches.

The present embodiment is the preferred embodiment, but it is to be understood that changes can be made in the present embodiment by one skilled in the art without departing from the spirit and scope of the present invention.

Generally, the present invention is applied to a motor vehicle hydraulically controlled transmission having plurality of clutches which are selectively operable to achieve a plurality of different speed ratios in either the forward or rearward directions. The transmission clutches are selectively operated by a transmission control valve which is connected to a transmission pump. Because of the necessary hydraulic fluid pressures for proper operation of the transmission clutches it commonly occurs that as the transmission control valve is operated to shift the transmission, fluid-pressure surges through the transmission control valve to various ones of the clutches will prevent the shifting from being smooth, but will cause shifting shocks rendering the shifting operations somewhat jerky. These shifting shocks are particularly undesirable in motor vehicles since the shocks are transmitted to the wheels of the vehicle to cause a jerky or erratic movement thereof. The invention makes use of a common method of operation of a motor vehicle having a hydraulically controlled transmisison wherein the throttle pedal is released by the operator of the motor vehicle when the transmission is being shifted to a different speed ratio. The throttle linkage of the vehicle is combined with a differential-type pressure-regulating valve to produce a simple and unique arrangement wherein the pressure delivered from the transmission pump to the transmission control valve is momentarily substantially reduced during the shifting operations of the transmission. The pressure-regulating valve is connected between the pressure side of the transmission pump and the reservoir. The valve is of the differential pressure type and the spool thereof is associated with the throttle linkage so that when the throttle is released by the operator of the vehicle preparatory to shifting the transmission, the pressure-regulating valve is automatically adjusted to open at a relatively low pressure setting, and thusly the pressure of the hydraulic fluid in the line to the transmission control valve is substantially reduced. The transmission clutches are normally spring biased to the de-clutched position so that the drop in pressure to the transmission control valve in no way prevents any one of the clutches from being operated to the de-clutched position. After the transmission is shifted the operator again steps on the throttle pedal to bring the speed of the engine of the vehicle up from low idle speed to operating speed.

Increasing the throttle setting will, through the throttle linkage cause the pressure-regulating valve to be adjusted to a relatively high pressure setting so that the pressure of the hydraulic fluid from the pump to the transmission control valve will be increased to cause a smooth operation of the selected clutch. The transmission is thereby operated in the newly selected speed ratio with substantially reduced or eliminated shifting shock.

In detail, only the portions of the power train and control means of a motor vehicle which are necessary for an understanding of the present invention are shown as those elements may be constructed in any well known manner. Only the operating clutches for the transmission are shown and these are designated 10, 11, 12, 13 and 14. Each of the clutches 10 through 14 comprises a hydraulic piston and cylinder assembly cooperating with a plurality of clutch plates so that upon the application of sufficient hydraulic fluid under pressure to the cylinder portion of the clutch assembly, the piston portion is caused to force the plurality of clutch plates together in tight frictional engagement to complete the desired power train through the transmission to the wheels of the vehicle. The clutches are spring biased to the disengaged condition. A plurality of clutches are commonly used in hydraulically controlled motor vehicle transmissions, and the clutch 10 may be a clutch for producing operation of the vehicle in a forward direction, clutch 11 for the reverse direction, clutch 12 for the first or lowest speed ratio, clutch 13 for the second or intermediate speed ratio, the clutch 14 for the third or high speed ratio. Thus clutch 10 may be operated in conjunction with either one of clutches 12, 13 or 14 to produce operation of the transmission for the forward direction at some selected speed ratio. The various clutches 10 through 14 are respectively operated by the application of hydraulic fluid under pressure to the conduits 15, 16, 17, 18 and 19. The hydraulic fluid conduits 15 through 19 are connected to the transmission control valve 20.

Referring now to FIGURE 2 one of the clutches will now be described in detail. Further it is to be understood that the other clutches are of similar construction. Specifically the clutch 10 comprises a rotary power shaft 65 having a radially outwardly extending annular housing which encloses an annular piston 66 for reciprocal movement therein. The piston 66 is fluid actuated to the right by fluid under pressure supplied by the conduit 15. A plurality of clutch plates 67, one being indicated, are positioned within the annular housing for biased movement by a spring 70 to urge the piston 66 to the left in FIGURE 2. A plurality of other clutch plates 68, one being indicated, are spline-secured to a rotary gear 71. Thus upon the appearance of pressure fluid under pressure in conduit 15 the piston 66 is moved to the right resulting in frictional engagement between the plurality of clutch plates 67 and 68 to transmit rotary power from the rotary shaft 65 to the gear 71. Upon release of the pressure fluid under pressure in conduit 15 by the transmission control valve 20 the piston 66 is moved to the left through the action of the spring 70 thereby assuring disconnection of rotary motion between the rotary shaft 65 and the gear 71.

The transmission control valve 20 may be of any suitable type known in the art and is generally manually operated to a selected speed ratio and direction. The transmission control valve 20 is connected by a conduit 21 to the pressure side of the hydraulic fluid transmission pump 23. The fluid flow from the pump 23 through conduit 21 is directed through the transmission control valve to the selected ones of the conduits 15 through 19. The transmission pump 23 may be of any suitable type known in the art and is commonly continuously driven by the engine of the vehicle. The suction side of the transmission pump 23 is connected by a conduit 24 to the reservoir 25. The hydraulic fluid pressure to the transmission control valve is regulated by a pressure relief valve 30 which may be of any suitable type well known in the art. As shown in the drawing in a diagrammatic form, the pressure relief valve 30 comprises a valve housing having a spring biased ball therein which will be unseated to permit fluid to flow through the valve if the pressure at the inlet side thereof rises above that for which the valve is adjusted. The inlet side of the valve 30 is connected by a conduit 31 in the conduit 21 and the outlet side of the valve 30 is connected by a conduit 32 to the reservoir 25. By way of example, a number of well known systems use a pressure relief setting of 125 pounds per square inch, such a pressure being sufficient to insure proper operation of clutches 10 through 14. A system as above described will commonly produce shifting shocks as the transmission control valve 20 is operated to shift the transmission between the various speed ratios thereof.

The present invention is combined with a system as above described and further cooperates with the throttle system of the motor vehicle. The particular throttle system shown is merely by way of example and may be constructed in any well known form. As shown in the drawing, a throttle valve 40 is operated by a throttle linkage comprising a link 41, a link 42, a lever assembly 43 and a throttle pedal 44. The lever assembly 43 comprises a shaft carried in the motor vehicle for rotation about the longitudinal axis thereof. A short lever arm is secured on one portion of the shaft and connected at its outer end to one end of the link 42. The other end of the link 42 is pivotally connected to one end of the link 41, and the other end of the link 41 is connected to the throttle valve 40. The throttle linkage is shown in the low idle or minimum position, wherein the throttle valve 40 is substantially closed. Thus it may be seen that if the shaft of the lever assembly 43 is rotated to cause the link 42 to be moved toward lever assembly 43, the throttle valve 40 will be operated to an open throttle position wherein the engine of the vehicle is caused to increase in speed. The shaft of the lever assembly 43 is operated by the throttle pedal 44 one end of which is pivotally carried in the motor vehicle and the other end of which is connected by a short link 45 to a second short lever arm forming a part of the lever assembly 43. Thus it may be seen that when a person's foot is depressed upon the throttle pedal 44, the throttle valve 40 is operated to an open throttle position.

The present invention contemplates an arm 48 secured to the throttle link 42 to move therewith as the throttle linkage is operated by the throttle pedal 44. The extending portion of the arm 48 engages one end of a member 49 which forms a part of the differential-type pressure-regulating valve 50.

The pressure-regulating valve 50 comprises a valve body having a valve bore 51 formed axially therethrough. One end of the member 49 is slidably carried in the valve bore 51 and the member 49 is retained within the valve bore 51 by a snap ring 52 carried in a suitable groove in the valve 50 engaging a shoulder formed on the member 49. The portion of the member 49 carried in the valve bore 41 is provided with an annular groove which carries an O-ring 53 which prevents the leakage of fluid from the valve bore 51 past the member 49. As shown in the drawing, the member 49 is in its outwardmost position when the throttle pedal is released or is positioned in the low idle minimum throttle position thereof. It may further be seeen that when the throttle pedal 44 is depressed or operated, the arm 48 to the throttle link 42 will move the member 49 inwardly of the valve 50. The member 49 is provided with a central cylindrical hole which carries one end of a compressed coiled spring 54. The other end of the compressed coiled spring 54 engages one end of a valve spool 56.

The valve spool 56 is formed with a valve head 57 on one end thereof and a guide member 58 at the other end thereof. The valve spool 56 is carried for sliding reciprocating movement in a valve head and guide assembly 60. The assembly 60 is substantially cylindrical in shape with one end being open and carrying a valve seat therein. The other end of the assembly 60 has a cylindrical hole therein which carries the guide portion 58 of the valve spool 56. The diameter of the guide portion 58 is less than the diameter of the hole through the valve seat. The assembly 60 is carried in the valve bore 51 and is restrained therein against axial movement. The assembly 60 is provided with a hole 61 therethrough which is in axial alignment with a port formed through the body of the valve 50. That port in turn is connected to one end of a hydraulic fluid conduit 62 the other end of which is connected to conduit 21. A further port is formed through the body of the valve 50 and that port is connected by a conduit 63 to conduit 32. The second port is positioned between the assembly 60 and the member 49 adjacent the end of the assembly 60. Thus it may be seen that hydraulic fluid under pressure from conduit 62 may enter the assembly 60 through the hole 61. The hydraulic fluid pressure therein will act against the valve head 57 and since the diameter of the valve head 57 is larger than the diameter of the guide portion 58 of the spool 56, a net force on the valve head 57 will be produced tending to unseat the valve head 57 from the valve seat. The force tending to unseat the valve head 57 is opposed by the biasing force of the coiled spring 54 which is positioned between the member 49 and the spool 56.

The biasing force of the coiled spring 54 is selected as one wherein a relatively small net force of the hydraulic fluid pressure in conduit 62 and the assembly 60 on the valve head 57 will unseat the valve head 57 when the throttle pedal is in the low idle position, and correspondingly the member 49 is in its outwardmost position as shown in the drawing. By way of example the biasing force of the spring 54 for low idle throttle position may be such as to require a net unseating force on the valve spool 56 of ten pounds per square inch. The arrangement is further constructed so that when the throttle pedal 44 is depressed to operate the throttle valve 40 to an open position, the arm 48 is moved to move the member 49 inwardly of the valve 50 to further compress the coiled spring 54 to cause the coiled spring 54 to seat the valve spool 56 with a force substantially equal to the net unseating force of the hydraulic fluid acting on the spool 56 when the pressure in conduit 62 approximates the setting of the pressure relief valve 30. In other words, the biasing force of the coiled spring 34 is such as to permit the fluid pressure in the assembly 61, the conduit 62, and the conduit 21 to reach a value permitting a sufficient hydraulic fluid pressure in conduit 21 to properly operate the clutches 10 through 14. The pressure relief valve 30 may be set to open at a pressure higher than that which will unseat the valve spool 56 with the throttle in an open position so that the pressure relief valve 30 may function as a safety valve to prevent the production of excessively high pressures in the transmission control conduits. With the spring 54 of the valve 50 providing a pressure setting lower than that of the pressure relief valve 30, the valve 50 will function as a pressure regulating valve to maintain the operating pressure for the transmission clutches 10 to 14 at a proper pressure. Should the pressure in conduit 21 rise above that for which the valve 50 is set to open, the hydraulic fluid from conduit 21 will flow through conduit 62, hole 61 of assembly 60, to valve head 57. Valve head 57 will be unseated and the hydraulic fluid will then flow through valve bore 51, conduit 63 and conduit 32 through the reservoir 25.

From the foregoing it may be seen that the present invention provides an arrangement whereby, upon release of the throttle pedal 44, the hydraulic fluid pressure in conduit 21 from the pump 23 to the transmission control valve 20 is dropped to a relatively small value which will prevent the occurrence of shifting shocks as the transmission is shifted to a different speed ratio. As soon as the throttle pedal 44 is gradually depressed after shifting of the transmission, the hydraulic fluid pressure in the conduit 21 is immediately caused to gradually rise and thus cause a gradual engagement of the clutches 10 through 14 for a smooth shock-free acceleration of the vehicle.

Having described the invention, what is considered new and desired to be protected by Letters Patent is:

1. A valve means for a clutch control arrangement for a motor vehicle having a hydraulic fluid conduit for delivering hydraulic fluid at a certain pressure to said clutch to effect operation thereof comprising, throttle linkage means for varying the throttle setting of said motor vehicle, said valve means connected to said conduit, said valve means comprising a valve seat effecting fluid communication between the connection of said valve means to said conduit and a vent line, spool means having a valve head thereon slidably carried in said valve means in cooperation with said valve seat, spring means biasing said valve head against said valve seat in a direction opposing any fluid pressure from said conduit on said valve head, spring retaining means operable to vary the biasing force of said spring means, and means carried on said throttle linkage in cooperation with said spring retaining means for operating said spring retaining means to vary the biasing force of said spring means directly with said throttle setting.

2. A valve means for a clutch control arrangement for a motor vehicle having a hydraulic fluid conduit for delivering hydraulic fluid at a certain pressure to said clutch to effect operation thereof comprising, throttle linkage means selectively operable by a throttle pedal to vary the throttle setting of the engine of said motor vehicle from a minimum throttle setting to various higher throttle settings, valve means connected to said conduit, said valve means comprising a valve seat effecting fluid communication between the connection of said valve means to said conduit and a vent line, spool means having a valve head thereon slidably carried in said valve means in cooperation with said valve seat, spring means biasing said valve head against said valve seat in a direction opposing any fluid pressure from said conduit on said valve head, spring retaining means operable to vary the biasing force of said spring means, and an arm connected to said linkage means and positioned in cooperation with said spring retaining means for operating said spring retaining means to vary the biasing force of said spring means to maintain the fluid pressure in said conduit substantially equal to said certain fluid pressure when the setting of said throttle is higher than said minimum throttle setting and to vent hydraulic fluid from said conduit at a minimum fluid pressure ineffective to cause operation of said clutch when the throttle setting of said throttle is at said minimum throttle setting.

3. A valve for a control arrangement for the hydraulically operated and spring restored clutches of a motor vehicle transmission wherein said motor vehicle is provided with a transmission control valve connected to said clutches and a hydraulic fluid conduit connected to said transmission control valve for delivering hydraulic fluid a certain pressure to said transmission control valve for effecting selective operation of said clutches comprising, said valve having a pressure port and a vent port, a second hydraulic fluid conduit connected between said pressure port and said first hydraulic fluid conduit, said valve having a valve bore formed therein, said pressure and vent ports connected into said valve bore in a spaced apart relationship to each other, a valve seat formed in said valve bore between said pressure and said vent ports, a valve spool having a valve head formed thereon slidably carried in said valve bore with said valve head in cooperation with said valve seat, spring means for biasing said valve head against said valve seat in a direction opposing any hydraulic fluid pressure from said pressure port acting on said valve head, means operable to adjust the biasing force of said spring means, and throttle responsive means for operating said last mentioned means.

4. In a control arrangement as defined in claim 3, wherein said spring means is formed relative to the effective area of said valve head so that said valve head is unseated from said valve seat when the fluid pressure in said second conduit rises above said certain fluid pressure when said throttle is substantially open, and said valve head is unseated from said valve seat when the fluid pressure in said second conduit is substantially below that necessary for effecting operation of said clutches when said throttle is substantially closed.

5. A valve for a control arrangement for the hydraulically operated and spring restored clutches of a motor vehicle transmission wherein said motor vehicle is provided with a transmission control valve connected to said clutches and a hydraulic fluid conduit connected to said transmission control valve for delivering hydraulic fluid at a certain pressure to said transmission control valve for effecting selective operation of said clutches comprising, throttle linkage means for varying the throttle setting of said motor vehicle, said valve having a pressure port and a vent port, a second hydraulic fluid conduit connected between said pressure port and said first hydraulic fluid conduit, said valve having a valve bore formed therein, said pressure and vent ports connected into said valve bore in a spaced apart relationship to each other, a valve seat formed in said valve bore between said pressure port and said vent port, a valve spool having a valve head formed thereon slidably carried in said valve bore with said valve head in cooperation with said valve seat, spring means for biasing said valve head against said valve seat in a direction opposing any hydraulic fluid pressure from said pressure port acting on said valve head, spring retaining means operable to adjust the biasing force of said spring means, and means carried on said throttle linkage means in cooperation with said spring retaining means to adjust the biasing force of said spring means directly with said throttle setting.

6. A valve for a control arrangement for the hydraulically operated and spring restored clutches of a motor vehicle transmission wherein said motor vehicle is provided with a transmission control valve connected to said clutches and a hydraulic fluid conduit connected to said transmission control valve for delivering hydraulic fluid at a certain pressure to said transmission control valve to effect selective operation of said clutches comprising, throttle linkage means selectively operable by a throttle pedal to vary the throttle setting of the engine of said motor vehicle from a minimum throttle setting to various higher throttle settings, said valve having a pressure port and a vent port, a second hydraulic fluid conduit connected between said pressure port and said first hydraulic fluid conduit, said valve having a valve bore formed therein, said pressure and vent ports connected into said valve bore in a spaced apart relationship to each other, a valve seat carried in said valve bore between said pressure port and said vent port, a valve spool having a valve head formed thereon and slidably carried in said valve bore with said valve head in cooperation with said valve seat, spring means for biasing said valve head against said valve seat in a direction opposing any hydraulic fluid pressure from said pressure port acting on said valve head, spring retaining means operable to adjust the biasing force of said spring means, and means connected to said linkage means and associated with said valve means for adjusting said valve means to vary the hydraulic fluid pressure in said conduit from said certain fluid pressure when the setting of said throttle is higher than said minimum throttle setting to a minimum fluid pressure ineffective to cause operation of said clutches when the throttle setting of said throttle is at said minimum throttle setting.

7. A valve for a control arrangement for the hydraulically operated and spring restored clutches of a motor vehicle transmission wherein said motor vehicle is provided with a transmission control valve connected to said clutches and a hydraulic fluid conduit connected to said transmission control valve for delivering hydraulic fluid at a certain fluid pressure to said transmission control valve for effecting selective operation of said clutches comprising, said valve having a valve bore formed therein, a valve spool slidably carried in one end of said valve bore, said valve spool comprising a valve head and a valve guide portion interconnected by a reduced portion, a valve seat in said valve bore between the valve head and said valve guide portion of said valve spool, the diameter of said valve seat being greater than the diameter of said valve guide, a coiled spring carried in said valve bore and having one end thereof engaging said valve spool to bias said valve head against said valve seat, a spring retaining member slidably carried in the other end of said valve bore with one end of said spring retaining member projecting outwardly of said valve, the other end of said spring retaining member being formed with a recess receiving the other end of said coiled spring therein, a pressure port connected into said valve bore between said valve seat and said one end of said valve bore, a vent port connected into said valve bore between said valve seat and said other end of said valve bore, a second hydraulic fluid conduit connected between said pressure port and said first hydraulic fluid conduit so that any hydraulic fluid pressure in said first and second conduits opposes the bias of said coiled spring on said valve head, said coiled spring having an initial biasing force when said one end of said spring retaining member is positioned in its outwardmost position from said valve insufficient to prevent said valve head from being moved from said valve seat by a hydraulic fluid pressure in said first and second conduits which is substantially below that pressure required for operation of said transmission clutches, and throttle responsive means for moving said one end of said spring retaining member inwardly of said valve to increase the biasing force of said coiled spring to provide a fluid pressure in said first and second conduits substantially equal to said certain pressure when the throttle of said motor vehicle is operated substantially above the minimum throttle setting thereof.

8. A control arrangement as defined in claim 7, wherein said throttle responsive means comprises throttle linkage means selectively operable by a throttle pedal to vary the throttle setting of said motor vehicle from a minimum throttle setting to various higher throttle settings, and an arm connected to said linkage means and engaging the end of said one end of said spring retaining member so that said one end of said spring retaining member is in its outwardmost position of said valve when the throttle setting of said throttle is at said minimum throttle setting and so that said one end of said spring retaining member is moved inwardly of said valve to increase the biasing force of said coiled spring when the setting of said throttle is higher than said minimum throttle setting.

References Cited in the file of this patent
UNITED STATES PATENTS

| | | |
|---|---|---|
| 2,633,035 | Livermore | Mar. 31, 1953 |
| 2,707,887 | Slack | May 10, 1955 |
| 2,733,732 | Baker | Feb. 7, 1956 |
| 2,809,536 | O'Malley | Oct. 15, 1957 |
| 2,832,231 | Edsall | Apr. 29, 1958 |
| 2,887,198 | Hobbs | May 19, 1959 |